United States Patent
Mathieu et al.

(10) Patent No.: US 9,234,980 B2
(45) Date of Patent: Jan. 12, 2016

(54) MINING SYSTEMS AND METHODS (75) Inventors: Gilles Mathieu, Meudon (FR); Kent Lang, Denver, CO (US); Peter Wraight, Skillman, NJ (US); Roland Banas, Tucson, AZ (US); James A. Grau, Marshfield, MA (US); Edward Clayton, Tucson, AZ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/990,946

(22) PCT Filed: Dec. 2, 2011

(86) PCT No.: PCT/US2011/063015
§ 371 (c)(1),
(2), (4) Date: Jun. 3, 2014

(87) PCT Pub. No.: WO2012/075365
PCT Pub. Date: Jun. 7, 2012

(65) Prior Publication Data
US 2014/0291499 A1 Oct. 2, 2014

Related U.S. Application Data (60) Provisional application No. 61/418,959, filed on Dec. 2, 2010.

(51) Int. Cl.
*G01V 5/00* (2006.01)
*G01V 8/10* (2006.01)
(Continued)

(52) U.S. Cl.
CPC . *G01V 8/10* (2013.01); *E21B 43/28* (2013.01); *E21B 47/00* (2013.01); *E21B 47/065* (2013.01); *E21B 47/09* (2013.01)

(58) Field of Classification Search
CPC ....... E21B 43/28; E21B 47/00; E21B 47/065; E21B 47/09; G01V 8/10

USPC ................ 250/254; 75/386; 266/90
See application file for complete search history.

(56) References Cited

U.S. PATENT DOCUMENTS

| 4,175,789 A | 11/1979 | Kube et al. |
| 4,464,569 A | 8/1984 | Flaum |

(Continued)

FOREIGN PATENT DOCUMENTS

| WO | 03036041 A2 | 5/2003 |
| WO | 2006036041 A1 | 4/2006 |

(Continued)

OTHER PUBLICATIONS

International Search Report and Written Opinion of PCT/US2011/063015 dated Jul. 30, 2012.
(Continued)

*Primary Examiner* — David J Makiya
*Assistant Examiner* — Taeho Jo (57) ABSTRACT

The present invention provides systems and methods capable of improving the efficiency and effectiveness of leaching operations. In one embodiment, the present invention may utilize a coiled tubing directional drilling system capable of treating interior portions of the heap/formation. In one embodiment, the present invention may utilize a system and method capable of capturing real time temperature and resistivity data pertaining to pregnant solution characteristics in the heap/formation. In one embodiment, the present invention may utilize one or more wire line deployed X-Ray Fluorescence (XRF) spectrometers capable of quantitatively measuring concentrations of desired metals in the heap/formation during leaching operations. In one embodiment, the present invention utilizes multiple passes of elemental capture spectroscopy logs acquired at regular time intervals to monitor metal concentrations during leaching operations. In one embodiment, the present invention provides one or more subsurface barriers capable of optimizing leaching operations.

14 Claims, 10 Drawing Sheets (51) Int. Cl.
*E21B 43/28* (2006.01)
*E21B 47/00* (2012.01)
*E21B 47/06* (2012.01)
*E21B 47/09* (2012.01)

(56) References Cited

U.S. PATENT DOCUMENTS

| | | | |
|---|---|---|---|
| 4,572,581 A | | 2/1986 | Horton et al. |
| 4,756,887 A | * | 7/1988 | Lesty et al. ............... 423/20 |
| 5,021,653 A | | 6/1991 | Roscoe et al. |
| 5,428,293 A | | 6/1995 | Sinclair et al. |
| 5,440,118 A | | 8/1995 | Roscoe et al. |
| 5,449,397 A | * | 9/1995 | Hunter et al. ............ 75/744 |
| 5,471,057 A | | 11/1995 | Herron et al. |
| 6,547,435 B1 | | 4/2003 | Grosswig et al. |
| 6,961,663 B2 | | 11/2005 | Sinclair et al. |
| 7,575,622 B2 | | 8/2009 | Crundwell et al. |
| 2003/0089201 A1 | * | 5/2003 | Harlamovs et al. ......... 75/722 |
| 2004/0124994 A1 | | 7/2004 | Oppelt |
| 2005/0066773 A1 | * | 3/2005 | Harlamovs et al. ......... 75/721 |
| 2005/0136527 A1 | * | 6/2005 | Buuren ................. 435/262 |
| 2005/0211019 A1 | * | 9/2005 | Crundwell et al. ......... 75/375 |
| 2007/0186724 A1 | | 8/2007 | Seal et al. |
| 2009/0236899 A1 | | 9/2009 | Geisler et al. |
| 2010/0082258 A1 | | 4/2010 | Wang |
| 2010/0201540 A1 | | 8/2010 | Li et al. |
| 2011/0120879 A1 | * | 5/2011 | Buschmann ............ 205/339 |
| 2012/0297928 A1 | * | 11/2012 | Lang et al. ............. 75/386 |

FOREIGN PATENT DOCUMENTS

| | | |
|---|---|---|
| WO | 2008007025 A2 | 1/2008 |
| WO | 2008033536 A2 | 3/2008 |

OTHER PUBLICATIONS

Bond, et al., "Several Uses and Installations of Pressure/Vacuum Lysimeters at Mining Facilities and Tailing Waste Sites", SME, 1984, 11 pages.

Brown, et al., "Optimizing the Operation of Bioheaps", Date unavailable.

Guzman, et al., Hydrodynamic Characterization and Optimization of the Chuquicamata Ripios Mina Sur Aglomerados Heap Leach Project—Part 2, Hydromet 2000, Tucson, Arizona, USA., 8 pages.

Killeen, PG, "Nuclear Techniques for Ore Grade Estimation", Proceedings of Exploration 97: Fourth Decennial International Conference on Mineral Exploration, 1997, pp. 677-684.

Ream, et al., "Kennecott's Bingham Canyon Heap Leach Program, Part 1: the Test Heap and SW-EW Pilot Plant", Proceedings ALTA 1997 Copper Hydrometallurgy Forum, Brisbane, Australia, Oct. 20-21, 1997, 40 pages.

Rhodes, et al., "A Radioisotope X-Ray Fluorescence Drill Hole Probe", Proceedings of the Symposium on the Use of Nuclear Techniques in the Prospecting and Development of Mineral Resources, 1969, pp. 353-363.

Wangerud, et al., "Insights Into Hydrodynamic and Geochemical Processes in a Valley-Fill Ard Waste-Rock Repository From an Autonomous Multi-Sensor Monitoring System", 7th International Conference on Acid Rock Drainage (ICARD), St. Louis, MO, Mar. 26-30, 2006, pp. 2262-2280.

Examination Report issued in Australian Application No. 2011336400 on Mar. 11, 2015, 6 pages.

Examination Report issued in Canadian Application No. 2,819,640 on Feb. 3, 2015, 3 pages.

Hizem, et al., "Dielectric Dispersion: A New Wireline Petrophysical Measurement", SPE 116130—SPE Annual Technical Conference and Exhibition, Denver, Colorado, 2008, pp. 1-21.

McDowell, et al., "In-Situ Nickel Assay by Prompt Gamma Neutron Activation Wireline Logging", SEG Annual Meeting, New Orleans, LA, 1998, 4 pages.

Office Action issued in Mexican Application No. MX/A/2013/006239 on May 29, 2014, 2 pages.

Nelson, et al., "Geophysical and geochemical logs from a copper oxide deposit, Santa Cruz project, Casa Grande, Arizona", Society of Exploration Geophysicists, vol. 59(12), 2015, pp. 1827-1838.

Office Action issued in Peruvian Application No. 1330.13 on Mar. 21, 2014, 15 pages.

* cited by examiner

MEASURED QUANTITIES:
$P_b$, $U$, $HI$, $W_{Cu}^T$, $W_S^T$, $W_{Fe}^T$, $W_{Si}^T$, $W_{Ca}^T$, $C$

DERIVED QUANTITIES:
$\Phi$, $\Phi * S_w$, $P_{ma}$, $P_w$, $W_{Cu}^{ma}$, $W_S^{ma}$, $W_{Fe}^{ma}$, $W_{Cu}^w$, $W_S^w$, $W_{Fe}^w$, $W_{H+}^w$

FIG. 6

MEASURED BULK DENSITY (FROM PEX LOGGING TOOL):
$P_b = P_{ma} * [1-\Phi] + P_w * [\Phi * S_w]$

MEASURED VOLUMETRIC PHOTOELECTRIC FACTOR (FROM PEX LOGGING TOOL):
$U = U_{ma} * [1-\Phi] + U_w * [\Phi * S_w]$

MEASURED EPITHERMAL HYDROGEN INDEX (FROM APS LOGGING TOOL):
$HI \sim [\Phi * S_w]$ MEASURED TOTAL COPPER (FROM ECS LOGGING TOOL):
$W_{Cu}^T = [W_{Cu}^{ma} * P_{ma} * (1-\Phi) + W_{Cu}^w * P_w * \Phi * S_w]/P_b$ MEASURED TOTAL SULFUR (FROM ECS LOGGING TOOL):
$W_S^T = [W_S^{ma} * P_{ma} * (1-\Phi) + W_S^w * P_w * \Phi * S_w]/P_b$ MEASURED TOTAL IRON (FROM ECS LOGGING TOOL):
$W_{Fe}^T = [W_{Fe}^{ma} * P_{ma} * (1-\Phi) + W_{Fe}^w * P_w * \Phi * S_w]/P_b$ ELECTRICAL CONDUCTIVITY (FROM PEX INDUCTION LOGGING TOOL):
$C = (1/a) * \Phi^m * S_w^n * C_w$

FIG. 7

RELATIONSHIPS BETWEEN MATRIX DENSITY, FLUID DENSITY
AND ELEMENTAL COMPOSITION:

$P_{ma} = P_{ma}(W_{Cu}^{ma}, W_S^{ma}, W_{Fe}^{ma}, W_{Si}^{ma}, W_{Ca}^{ma} ...)$ $P_w = P_w(W_{Cu}^w, W_S^w, W_{Fe}^w, W_{H+}^w ...)$

RELATIONSHIPS BETWEEN VOLUMETRIC PHOTOELECTRIC FACTORS OF MATRIX,
FLUID AND ELEMENTAL COMPOSITION:

$U_{ma} = U_{ma}(W_{Cu}^{ma}, W_S^{ma}, W_{Fe}^{ma}, W_{Si}^{ma}, W_{Ca}^{ma} ...)$ $U_w = U_w(W_{Cu}^w, W_S^w, W_{Fe}^w, W_{H+}^w ...)$

RELATIONSHIP BETWEEN SOLUTION CONDUCTIVITY
AND ELEMENTAL COMPOSITION:

$C_w = C_w(W_{Cu}^w, W_S^w, W_{Fe}^w, W_{H+}^w ...)$

COPPER IN MATRIX STOICHIOMETRIC BALANCE:
$W_{Cu}^{ma} = g_{ma}(W_S^{ma}, W_{Fe}^{ma})$

COPPER IN SOLUTION STOICHIOMETRIC BALANCE:
$W_{Cu}^w = g_w(W_S^w, W_{Fe}^w)$

*FIG. 8*

COMPLEX DIELECTRIC PERMITTIVITY (CRIM):

$[\varepsilon_t^*]^{1/2} = [\Phi * S_w] * [\varepsilon_w^*]^{1/2} + [1 - \Phi * S_w] * [\varepsilon_{ma}^*]^{1/2}$ WITH $\varepsilon_{ma}^* = f_{ma}(F, W_S^{ma}, W_{Fe}^{ma}, W_{Cu}^{ma})$ $\varepsilon_w^* = f_w(F, W_{Cw}^w, W_S^w, W_{Fe}^w, W_{H+}^w)$

MASS OF COPPER IN ORE PER UNIT VOLUME OF HEAP AT TIME T:
$$M_{Cu}^{ma}(T) = \int_0^Z (W_{Cu}^{ma}(T) * \rho_{ma}(T) * (1-\Phi(T)))dz$$

MASS OF COPPER IN SOLUTION PER UNIT VOLUME OF HEAP AT TIME T:
$$M_{Cu}^{ma}(T) = \int_0^Z (W_{Cu}^{w}(T) * \rho_{w}(T) * \Phi(T) * S_w(T) *)dz$$

FIG. 12

LEACHED OUT COPPER MASS PER UNIT VOLUME OF HEAP AT TIME T:
$$\Delta M_{Cu}^{ma}(T) = W_{Cu}^{ma}(TO) - M_{Cu}^{ma}(T)$$

INCREASE OF COPPER MASS IN SOLUTION PER UNIT VOLUME OF HEAP AT TIME T:
$$\Delta M_{Cu}^{w}(T) = W_{Cu}^{w}(T) - M_{Cu}^{w}(TO)$$

FIG. 13

% RECOVERY (COPPER LEACHED OUT OF ORE):
$$\%\Delta M_{Cu}^{ma} = \frac{\Delta M_{Cu}^{ma}(T)}{M_{Cu}^{ma}(TO)}$$

% INCREASE OF COPPER IN SOLUTION (RELATIVE TO INITIAL COPPER IN ORE):
$$\%\Delta M_{Cu}^{w} = \frac{\Delta M_{Cu}^{w}(T)}{M_{Cu}^{ma}(TO)}$$

MINING SYSTEMS AND METHODS

CROSS REFERENCE TO RELATED APPLICATIONS

This application claims priority to the filing date of U.S. Provisional Patent Application Ser. No. 61/418,959, entitled "Mining Systems and Methods", filed 2 Dec. 2010, which is hereby incorporated by reference in their entirety.

FIELD OF THE INVENTION

The present invention relates generally to mining operations and, more particularly, to heap and in-situ leaching systems and methods.

BACKGROUND OF THE INVENTION

Heap leaching is an industrial mining process used to extract metals from ore. Mined ore may be crushed into small chunks and heaped onto an impermeable plastic and/or clay lined leach pad. The heap of ore is irrigated with leaching solutions or lixiviants capable of dissolving the desired metals residing in the ore. As the lixiviant proceeds downwardly through the heap, an enriched or pregnant solution containing the lixiviant and the desired metals is created. The use of low permeability liner systems beneath the heap maximizes solution recovery and protects underlying groundwater conditions.

The pregnant solution proceeds downwardly (by gravity flow) through the heap where it may be retrieved using lined basins, sumps, and/or ponds for subsequent processing and recovery. After the desired metals are separated from the pregnant solution, the resulting barren solution or dilute lixiviant may be re-circulated to the heap for use in subsequent heap leaching operations. The barren solution may also be subjected to further treatment and/or removal of residual metals. Heap leaching operations may also be conducted under unsaturated liquid flow conditions wherein air flowing upwardly through the heap is utilized in conjunction with the lixiviant.

In-situ leaching is a mining process used to recover desired materials such as copper and uranium through wells drilled into a formation. Leaching solutions or lixiviants are pumped into the formation so that they come in contact with the desired materials. Explosive and/or hydraulic fracturing techniques may be used to create open pathways for the lixiviants in the formation. Pregnant solution bearing the lixiviant and the dissolved desired materials may then be pumped to the surface and processed. This process allows the extraction of desired materials from the formation without the need for conventional mining involving drill-and-blast, open-cut or underground mining.

One of the challenges faced when harvesting metals during leaching operations is accurately determining the location of the pregnant solution and the concentration of desired metals or materials with in the heap/formation. For example, it may be difficult to predict the location of the pregnant leach solution, how high the plume is and when it will start to decline in metal concentration. Further, it may be difficult to monitor how efficiently desired metals or materials are leached from the heap/formation. There remains a need for a system and method capable of accurately monitoring the effectiveness and efficiency of leaching processes in a real time environment.

SUMMARY OF THE INVENTION

Accordingly, the present invention provides systems and methods capable of improving the efficiency and effectiveness of leaching operations. In one embodiment, the present invention provides a directional drilling system capable of treating one or more interior portions of the heap/formation in preparation for or during leaching operations. In one embodiment, the directional drilling system utilizes a coil tubing arrangement.

In one embodiment, the present invention further provides a system and method capable of generating real time data concerning the location of the pregnant solution within the heap/formation utilizing one or more monitoring wells. In one embodiment, each monitoring well is equipped with monitoring system(s) capable of capturing and relaying real time data pertaining to the temperature and/or resistivity conditions in the heap/formation for use in determining the location and characteristics of the pregnant solution.

In one embodiment, the present invention may utilize Distributed Temperature Sensing (DTS) fiber optic sensor arrangements to monitor temperature values in the heap/formation. DTS sensor arrangements may be placed in multiple monitoring wells so as to generate profiles of the temperature values within the heap/formation.

In one embodiment, the present invention may utilize one or more resistivity sensor arrangements capable of gathering resistivity data for use in profiling the resistivity characteristics of the heap/formation over time. In one embodiment, resistivity information may be used to identify the position of the pregnant solution within the heap/formation and may be expressed as a function of the porosity, moisture content and conductivity of the pregnant solution. In one embodiment, resistivity information pertaining to the heap/formation may be collected utilizing a series of electrodes positioned within one or more monitoring wells.

In one embodiment, the present invention may utilize one or more X-Ray Fluorescence (XRF) spectrometers to quantitatively measure concentrations of desired metals in the heap/formation during leaching operations. In one embodiment, the XRF spectrometer(s) may be lowered into one or more monitoring wells using a down-hole wire line tool, or other suitable apparatus, in order to collect data concerning concentrations of desired materials within the heap/formation. In one embodiment, XRF spectrometer(s) may be utilized to measure desired metal concentrations in blast boreholes, in one or more monitoring wells, and/or in plastic monitoring ports.

In one embodiment, the present invention may utilize elemental capture spectroscopy to measure and monitor the dry weight of metals during leaching operations. In one embodiment, the present invention utilizes multiple passes of elemental capture spectroscopy logs acquired at regular time intervals to monitor metal concentrations during leaching operations. Elemental capture spectrometers may be positioned in one or more monitoring wells constructed or drilled into the heap/formation. The monitoring wells may be constructed or drilled according to any suitable configuration, including vertical and/or horizontal configurations.

In one embodiment, successive logs (ratio of dry weight measurements, for example) may be compared with respect to depth and time information pertaining to the leaching operation. This feature of the present invention provides valuable information about the efficiency of the leaching process, allowing troublesome areas to be identified and addressed. In one embodiment, the present invention provides a process for estimating the porosity, moisture, matrix, solution density and concentrations of materials of interest in the heap/formation and in the leaching solution.

In one embodiment, the present invention may utilize one or more subsurface barriers capable of optimizing leaching operations. In one embodiment, the present invention utilizes one or more active and/or passive injection control devices to (1) homogenize the flow of lixiviants between injection and production wells during in-situ leaching operations; and (2) homogenize the flow of chemicals into the heap/formation to create underground barriers for the purpose of mitigating/preventing contamination of surrounding areas.

In one embodiment, the present invention is capable of safeguarding mining operations by: (1) utilizing, at the periphery of the leaching operation, one or more sub-surface barriers capable of diverting possible inflows from natural ground waters into the heap/formation; (2) utilizing, at the periphery of the leaching operation, one or more sub-surface barriers capable of preventing possible leaks and outflows of the residual leaching solutions into the surrounding areas; and (3) utilizing, at the periphery of the operation, one or more wells containing equipment capable of detecting, monitoring, and reducing the risk of such unwanted inflows or outflows.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings; it being understood that the drawings contained herein are not necessarily drawn to scale; wherein.

DETAILED DESCRIPTION OF THE INVENTION

In the following description, numerous details are set forth to provide an understanding of the present invention. However, it will be understood by those skilled in the art that the present invention may be practiced without these details and that numerous variations or modifications from the described embodiments may be possible. The instant application discloses a number of features and examples relating thereto. It should be understood that the disclosed features may be used separately and/or according to various combinations.

Figure 1:
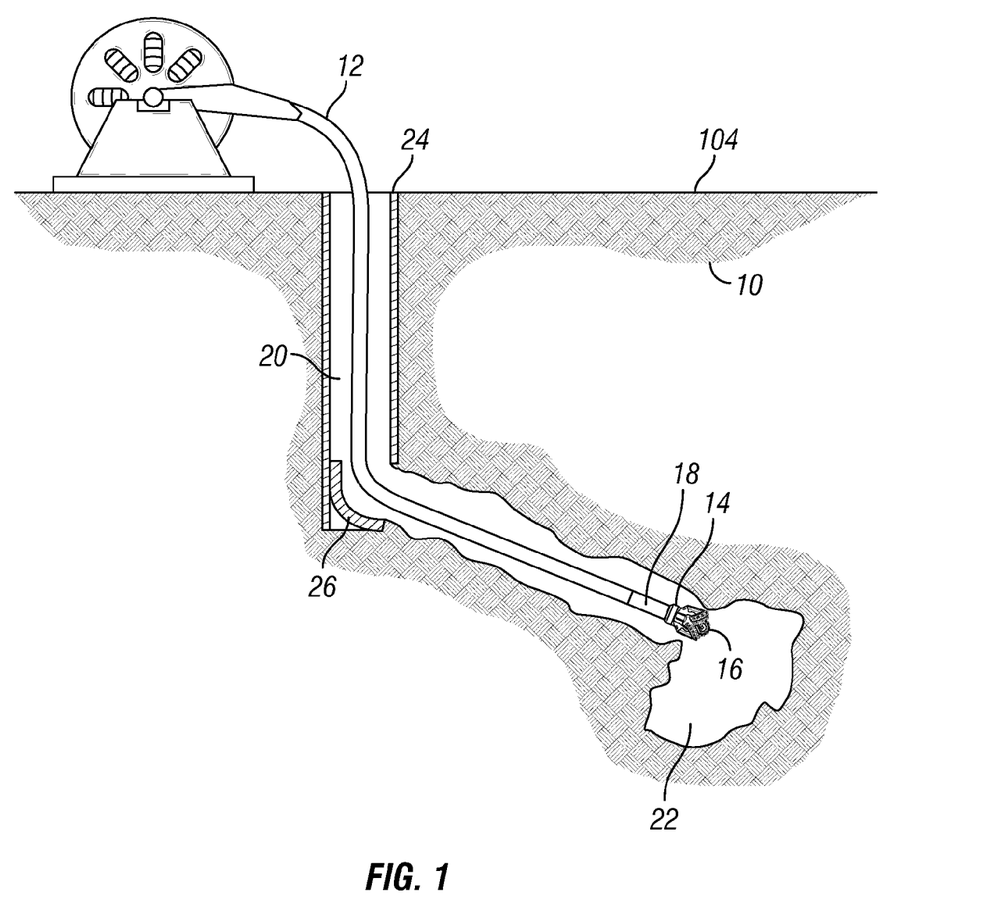
FIG. 1 is a cross sectional view of a heap/formation illustrating the coiled tubing directional drilling system of one embodiment of the present invention.

The present invention provides systems and methods capable of improving the efficiency and effectiveness of leaching operations. Referring to FIG. 1, in one embodiment, the present invention provides a directional drilling system capable of treating one or more interior portions of the heap/formation (10) in preparation for or during leaching operations. In one embodiment, the directional drilling system provided by the present invention utilizes a coil tubing arrangement (12), a rotary assembly (14), and drill bit (16).

Additional functionality (18) may be used to facilitate the utilization and servicing of the example directional drilling system shown in FIG. 1, including but not limited to mudding while drilling functionality, steering assemblies, etc. As the directional drilling system is being rotated by a drilling rig or other drilling apparatus (not shown) at the surface (10H) of the heap/formation (10), a substantial volume of a suitable drilling fluid or a so-called "mud" may be pumped downwardly through the system in order to cool the drill bit as well as facilitate the operation of the rotary assembly (14).

In one embodiment, the directional drilling system of the present invention may be used to drill one or more wells (20) into the heap/formation in order to access the portion of the heap/formation to be treated (illustrated by 22 in FIG. 1). Treatment fluid(s) such as acid, air, etc, may then be used to treat one or more portions of the heap/formation. The directional drilling system may also be used in conjunction with other drilling systems. For example, a conventional well with casing (24) may be drilled and then equipped with a kick off (26) to facilitate the insertion and orientation of the directional drilling system.

Figure 2:
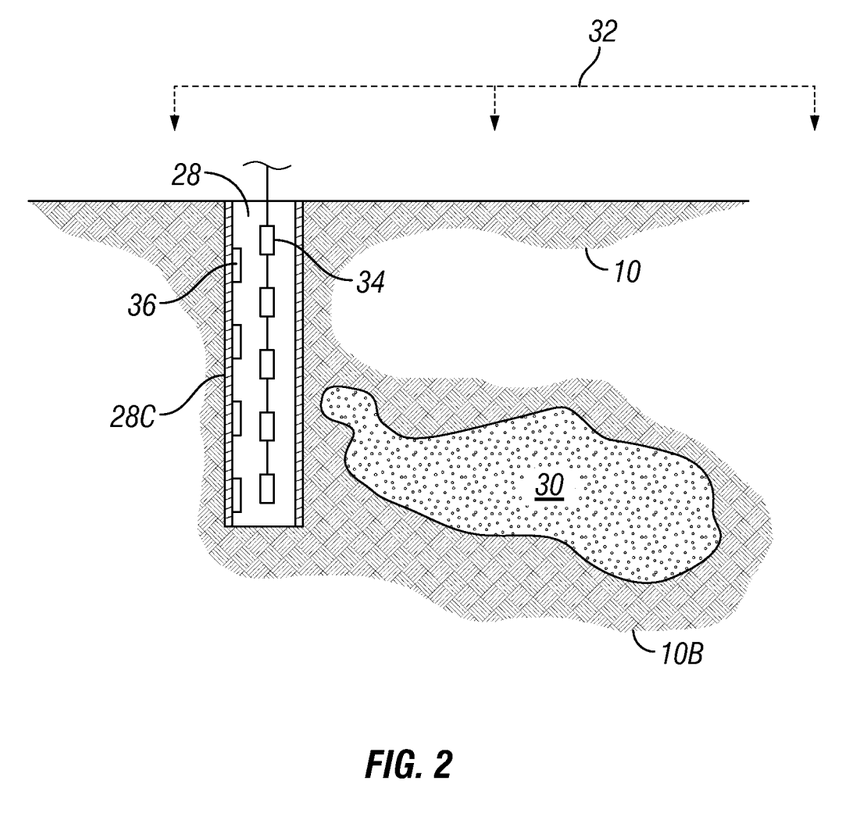
FIG. 2 is a cross sectional view of a heap/formation illustrating the temperature and resistivity monitoring systems of one embodiment of the present invention.

Turning to another feature of the present invention, in one embodiment, the present invention provides a system and method capable of generating real time data concerning the location of the pregnant solution within the heap/formation. Referring to FIG. 2, in one embodiment, the present invention utilizes one or more monitoring wells (28) drilled into the heap/formation (10) having casing (28C). In one embodiment, each monitoring well may be equipped with one or more monitoring systems capable of relaying real time data pertaining to temperature and/or resistivity conditions in the heap/formation for use in determining the location of the pregnant solution (30).

Regarding the use of temperature data, chemical reactions taking place in the heap/formation (10) when the leaching solution (32) comes in contact with the ore are often exothermic. Thus, the temperature at a given depth in the heap/formation may be expressed as a function of the on-going chemical reaction and of the heat generated thereby. In one embodiment, the present invention is capable of monitoring temperature values along a vertical profile of the heap/formation in order to track the progress of the pregnant solution (30) over time.

Such temperature data may then be utilized (via extrapolation or other suitable conventions) to predict when the pregnant solution will reach the bottom (10B) portion of the heap or a predefined position in the formation. In one embodiment, the present invention may utilize Distributed Temperature Sensing (DTS) fiber optic sensor arrangements (34) in order to monitor temperature values in the heap/formation. DTS sensor arrangements (34) may be placed in multiple monitoring wells so as to generate profiles of the temperature values within the heap/formation. Sensor arrangements may be positioned inside the monitoring well in any suitable manner.

Figure 3:
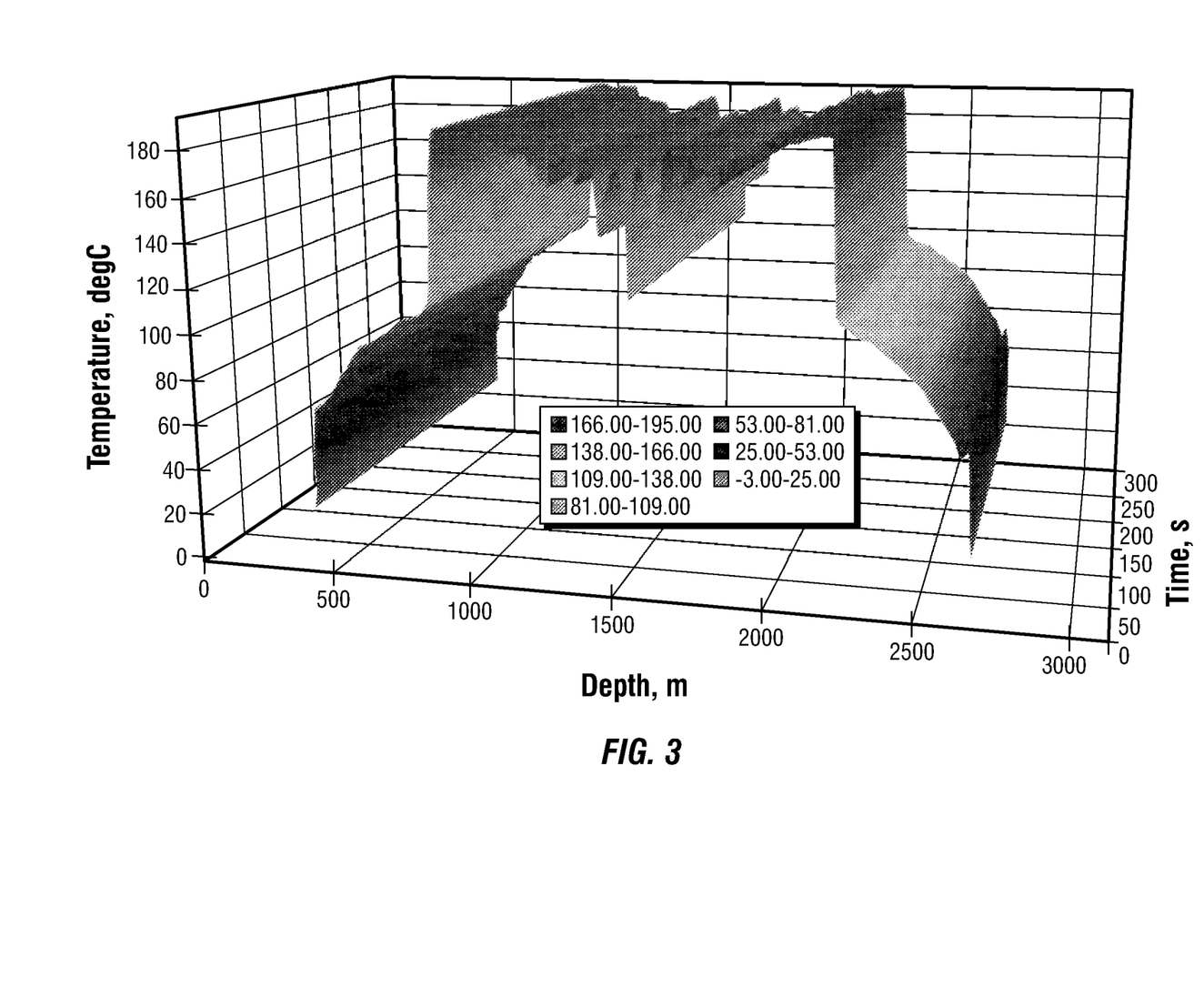
FIG. 3 is an example three dimensional temperature profile where temperature data is expressed in relation to depth and time information.

FIG. 3 illustrates an example 3D temperature profile where temperature data is expressed in relation to depth and time information. In one embodiment, various colors may be used to indicate temperature variations observed within the heap/formation. For example, a red color may be used for higher temperatures while a purple color may be used to indicate lower temperatures.

In one embodiment, the present invention is capable of generating a recent temperature profile relating to recent temperature changes in the heap/formation. In one embodiment, the present invention utilizes information concerning the current vertical temperature profile, historical temperature information obtained since the initiation of the leaching process, and estimates of the heat storage capacity of the heap/formation to generate a recent temperature profile. The recent temperature profile may then be utilized to define the active and/or declining area(s) of the heap/formation such that plans to optimize production may be generated and implemented. In one embodiment, multiple monitoring wells may be strategically positioned throughout the heap/formation so as to provide a complete picture of temperature values within the heap/formation and, in turn, provide information concerning the movement of the pregnant solution (30) through the heap/formation (10).

Referring back to FIG. 2, in one embodiment, the present invention may utilize one or more resistivity sensor arrangements (36) capable of gathering resistivity data for use in profiling the resistivity characteristics of the heap/formation over time. Ore subjected to leaching typically has low moisture content due air-filled pores. Thus, at any given depth, the heap/formation may be very resistive. As the leaching solution (32) is applied to the heap/formation, the pores of the ore comprising the heap/formation will at least partially fill with conductive pregnant solution resulting in a reduction of resistivity in the area.

In one embodiment, resistivity information may be used to identify the position of the pregnant solution (30) within the heap/formation (10) and may be expressed as a function of the porosity, moisture content and conductivity of the pregnant solution. In one embodiment, resistivity information pertaining to the heap/formation may be collected utilizing a series of electrodes positioned within one or more monitoring wells (28). In one embodiment, the electrodes utilized by the present invention may be attached to the monitoring well casing and connected to a data logger or SCADA system (not shown).

Turning to another feature of the present invention, in one embodiment, the present invention may utilize one or more X-Ray Fluorescence (XRF) spectrometers to quantitatively measure concentrations of desired metals in the heap/formation during leaching operations. In one embodiment, one or more XRF spectrometers may be utilized as part of a down-hole wire line tool. In one embodiment, the XRF spectrometer utilized by the present invention may be any suitable x-ray instrument capable of chemically analyzing rocks, minerals, sediments and/or fluids. In one embodiment, the XRF spectrometer may be lowered into one or more monitoring wells using a down-hole wire line tool or other suitable apparatus in order to collect data concerning concentrations of desired materials within the heap/formation.

The analysis of major and trace elements in geological materials by x-ray fluorescence is facilitated by the behavior of atoms when they interact with radiation. To illustrate, when materials are excited with high-energy, short wavelength radiation (e.g., X-rays), can become ionized. If the energy of the radiation is sufficient to dislodge a tightly-held inner electron, the atom becomes unstable and an outer electron replaces the missing inner electron. When this happens, energy is released due to the decreased binding energy of the inner electron orbital compared with the outer one. The emitted radiation is of lower energy than the primary incident X-rays and is often referred to as fluorescent radiation. Because the energy of the emitted photon is characteristic of a transition between specific electron orbitals in a particular element, the resulting fluorescent X-rays may be used to detect the amount(s) of desired materials present within the heap. In one embodiment, XRF spectrometer(s) may be utilized to measure desired metal concentrations in blast boreholes, in one or more monitoring wells, and/or in plastic monitoring ports.

Turning to another feature of the present invention, in one embodiment, the present invention may utilize elemental capture spectroscopy to measure and monitor the dry weight of metals during leaching operations. Elemental capture spectroscopy involves the use of neutron inelastic scattering and/or gamma ray spectra to quantitatively determine the relative abundance of various chemical elements.

In one embodiment, the present invention utilizes multiple passes of elemental capture spectroscopy logs acquired at regular time intervals to monitor metal concentrations during leaching operations. Elemental capture spectrometers may be positioned in one or more monitoring wells constructed or drilled into the heap/formation. The monitoring wells may be constructed or drilled according to any suitable configuration, including vertical and/or horizontal configurations.

In one embodiment, monitoring wells utilized by the present invention may be equipped with fiberglass casings. This feature of the present invention allows conductivity and other electromagnetic measurements to be taken while avoiding potentially interfering signals that may be encountered when a steel casing is used, e.g., iron signals. In one embodiment, the present invention may utilize an initial elemental capture spectroscopy log taken soon after the heap/formation is constructed (or after infusion of lixiviants) in order to obtain an initial measurement of the metal properties of the heap/formation. This initial log may be used as a baseline for subsequent elemental capture spectroscopy logging operations.

In one embodiment, the present invention utilizes a heap/formation monitoring survey with a sufficient number of passes capable of improving the statistical precision of the measured metal yields in the leached heap/formation. In one embodiment, this is accomplished by stacking the elemental weights from several logging passes and conducting each pass at regular time intervals during the leaching operation. In one embodiment, repeated elemental capture spectroscopy surveys may be made in the same monitoring well such that absolute measurement accuracy is not necessary and a sufficient statistical precision is provided so as to make useful comparisons from one pass to the next.

In one embodiment, successive logs (ratio of dry weight measurements, for example) may be compared with respect to depth and time information pertaining to the leaching operation. This feature of the present invention provides valuable information about the efficiency of the leaching process, allowing troublesome areas to be identified and addressed.

Figure 4:
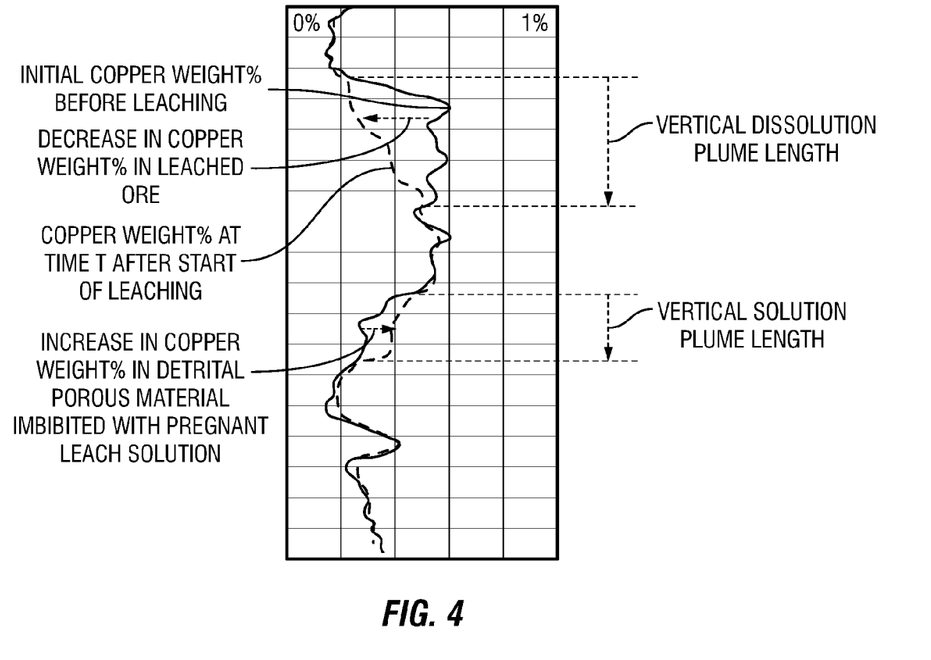
FIG. 4 is an example of successive logs generated by elemental capture spectroscopy readings.

In a leaching operation where copper is a desired metal, for example, the analysis of successive logs allows the present invention to, among other things, monitor: (1) the progression of copper content at the ore levels being leached; and (2) the increase in copper content at the levels of porous detrial (non-ore) material being traversed by the copper enriched pregnant solution, as illustrated by FIG. 4.

For example, in the copper example above, the present invention allows the estimation and time-lapse monitoring of the weight % of initial copper in ore that has been leached out at each level of the heap/formation. In one embodiment, this may be expresses as a minimum or as a maximum value (0, W(T0)−W(T), for example) assuming no change in porosity and liquid saturation. Further, the present invention allows the estimation and time-lapse monitoring of the copper content of the pregnant solution in front of detrital (non ore) levels, taking into account the porosity of the detrital non ore material saturated by the pregnant leach solution. For example, at each level of the heap/formation, this may be expressed as follows: [Maximum (0, (W(T)−W(T0)) ]*$\rho_b/(\Phi^*S_w^*\rho_w)$ assuming no change in porosity and liquid saturation wherein $\Sigma_b$ is the bulk density, $\Phi$ and $S_w$ are respectively the porosity and saturation at the same level of the heap, and $\rho_w$ is the estimated leach solution density.

Figure 5:
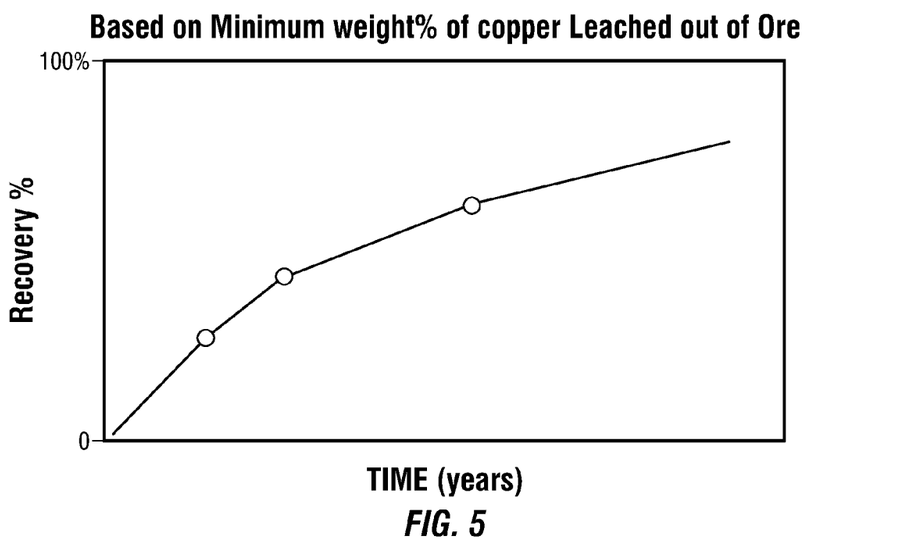
FIG. 5 is an example recovery curve illustrating the estimation of the minimum weight % of leached out copper over the height of a heap/formation over time.

In one embodiment, the estimation of the minimum weight % of leached out copper from ore may be integrated versus depth over the height of the heap/formation, and monitored over time as a recovery curve as illustrated by FIG. 5. Further quantities may be derived for each layer of the heap, such as the minimum weight of copper leached from ore and the maximum weight of copper in pregnant leach solution. In one embodiment, this is accomplished through combination of time lapse measurements such as porosity, hydrogen index, moisture content, bulk density, and resistivity measurements. For example, in the case of non-shale copper mineral ores, the combination of measurements and closure relationships would allow the Copper content in matrix $W_{Cu}^{ma}$ and in solution $W_{Cu}^{w}$ to be derived at each level of the heap/formation.

Figure 6:
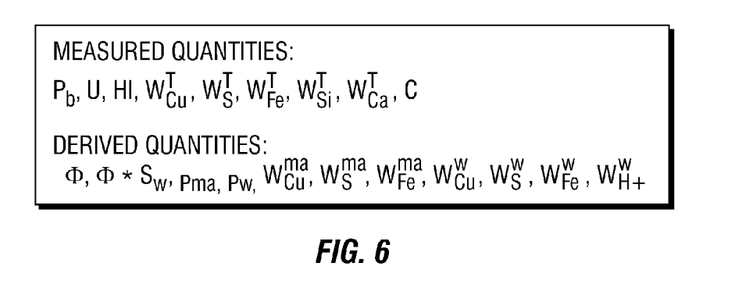
FIG. 6 illustrates example measured and derived quantities that may be utilized in one embodiment of the present invention.
Figure 7:
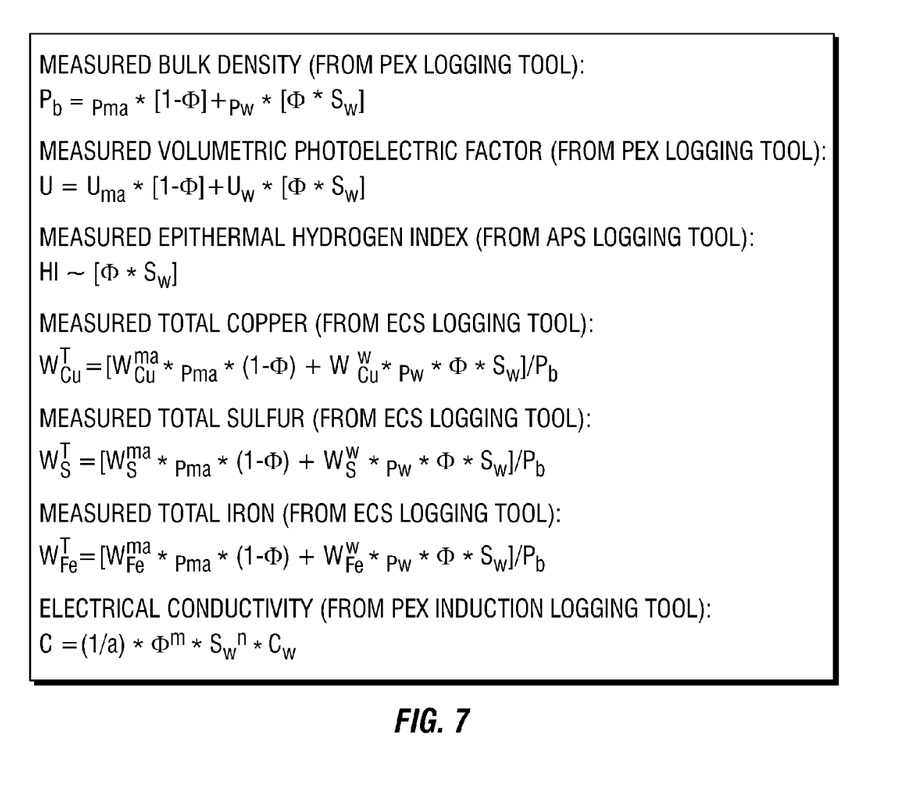
FIG. 7 illustrates example measurement and tool response relationships that may be utilized in one embodiment of the present invention.
Figure 8:
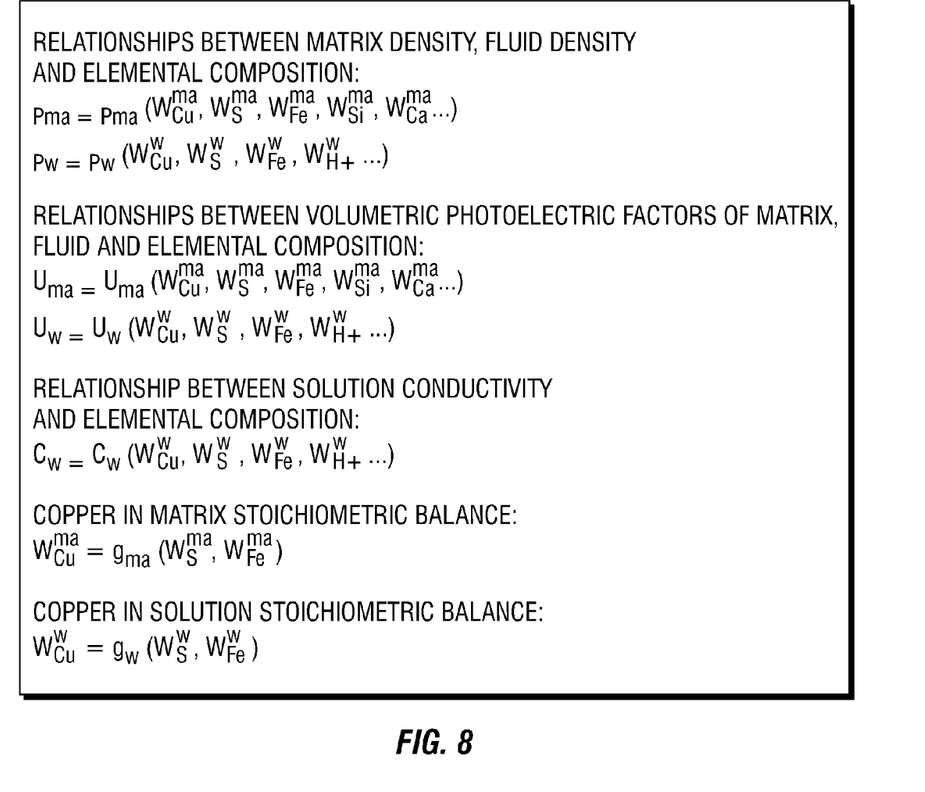
FIG. 8 illustrates example fluid and mineralogical relationships that may be utilized in one embodiment of the present invention.

For illustration, example measured and derived quantities are provided in FIG. 6; example measurement and tool response relationships are provided in FIG. 7; and example fluid and mineralogical relationships are provided in FIG. 8. The equations provided in FIGS. 6-8 may be utilized and resolved for the concentrations and quantities of interest, either analytically and/or sequentially, through the use of a suitable optimization process, or through the use of a neural network. Further, the equations provided in FIGS. 6-8 may be specifically tailored to the conditions of a particular leaching operation by using representative ore samples and/or fluid sample data.

Figure 9:
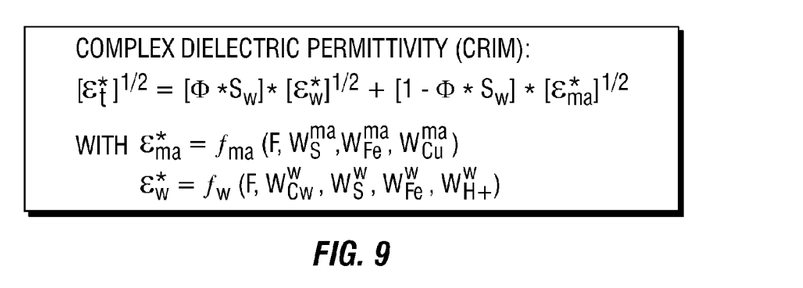
FIG. 9 illustrates an example complex dielectric permittivity equation that may be utilized in one embodiment of the present invention.
Figure 10:
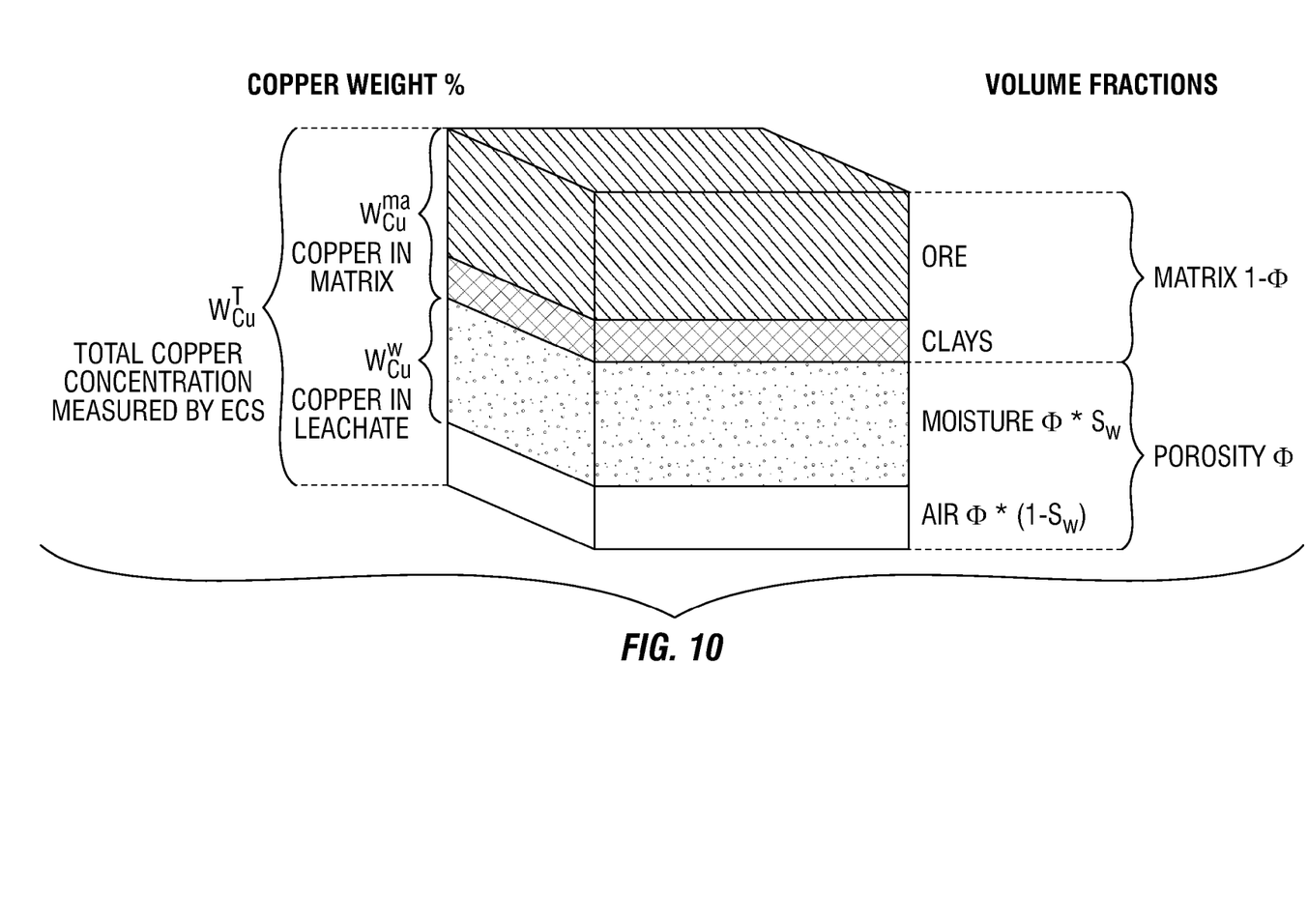
FIG. 10 illustrates an example rock formation and the associated elemental weight fractions for copper in one embodiment of the present invention.

Similar resolutions may also be made for complex ores containing shale materials by incorporating clay quantities and clay sensitive measurements such as Natural Gamma Ray Spectroscopy (NGT) and their associated tool responses. Complex permittivity and dielectric dispersion measurements may be utilized and obtained using a dielectric scanner or by using an X-signal provided by a suitable induction tool. The use of high complex permittivities of copper and iron minerals provide useful logging indicators which may be resolved through complex dielectric permittivity or other mixing law relationships, and specific ore and fluid sample characterizations. An example complex dielectric permittivity equation is provided in FIG. 9. Further, an example of the main components of a rock formation and the associated elemental weight fractions (for Copper in this example) to the component volumes of reference is provided in FIG. 10.

Figure 11:
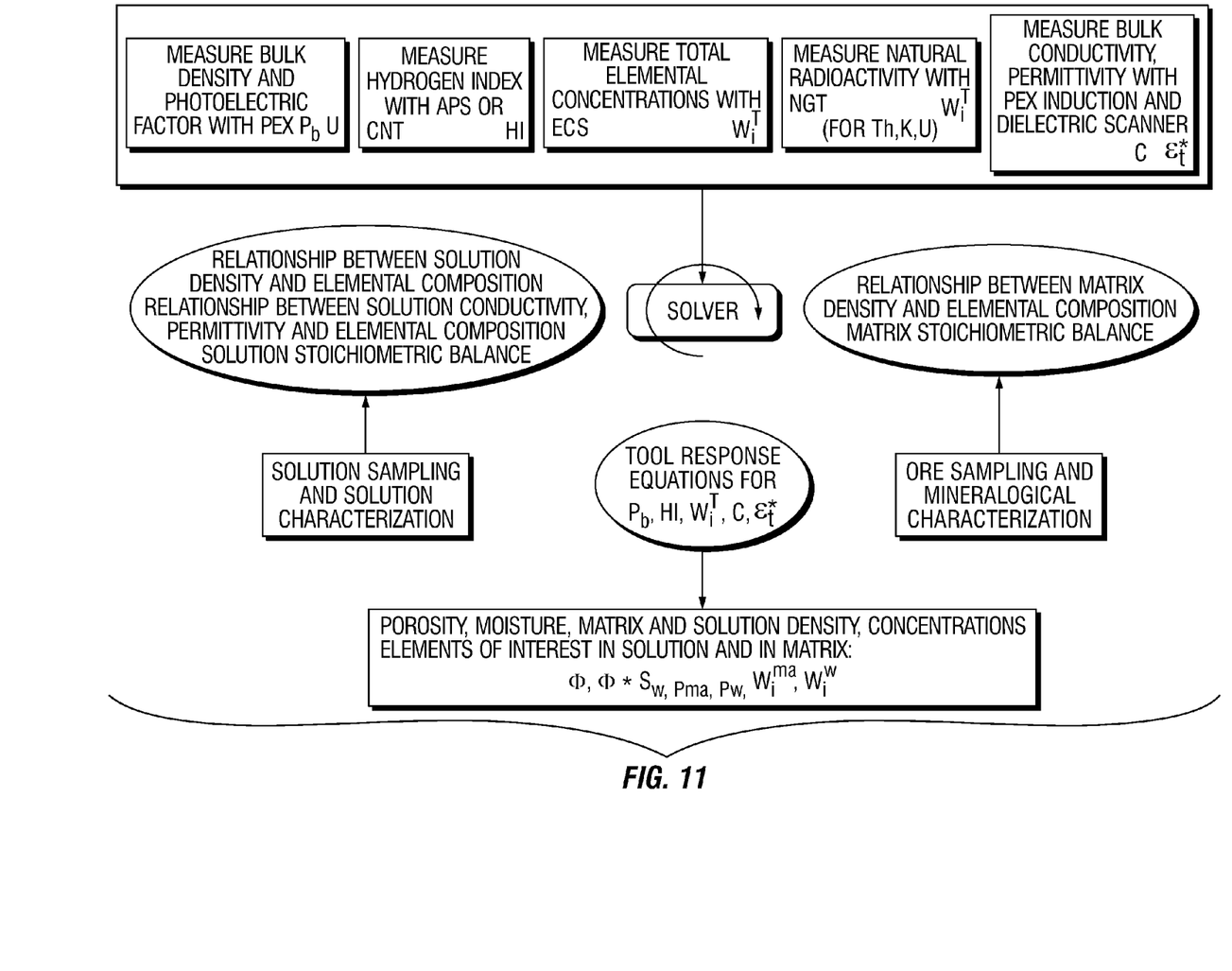
FIG. 11 illustrates a process of one embodiment of the present invention for estimating the porosity, moisture, heap/formation density, solution density and the concentration of materials of interest.

FIG. 11 illustrates a process of one embodiment of the present invention for estimating the porosity, moisture, heap/formation density, solution density and concentration of materials of interest. It should be noted that, even though the example process of FIG. 11 lists specific tools and parameters, actual logging options are not restricted to these examples. Any suitable logging tools with similar outputs can be used and additional measurements may be added to further optimize the processing results. For example, sonic porosity may be used in addition to or in lieu of nuclear porosity. Further, if all parameters are not available, it may still be possible to process one or more of the output parameters.

Figure 12:
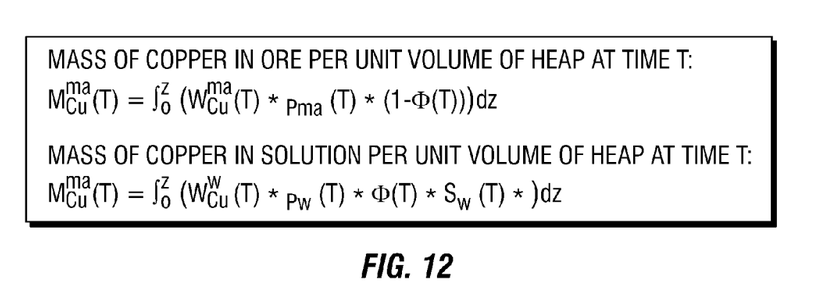
FIGS. 12-14 illustrate example equations that may be utilized in one embodiment of the present invention to facilitate the monitoring of copper content quantities as a recovery percentage over time.
Figure 13:
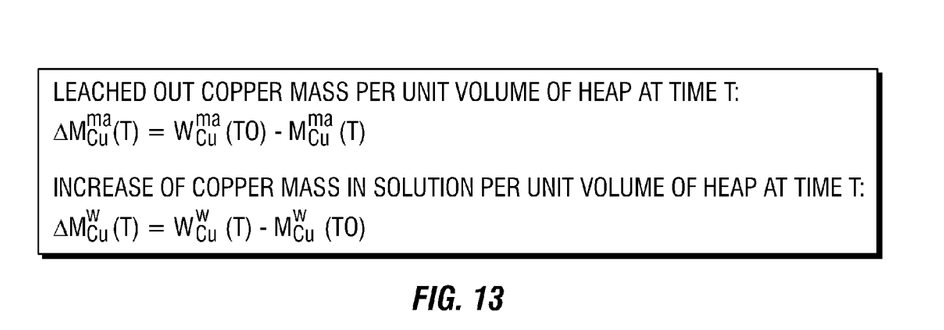
Figure 14:
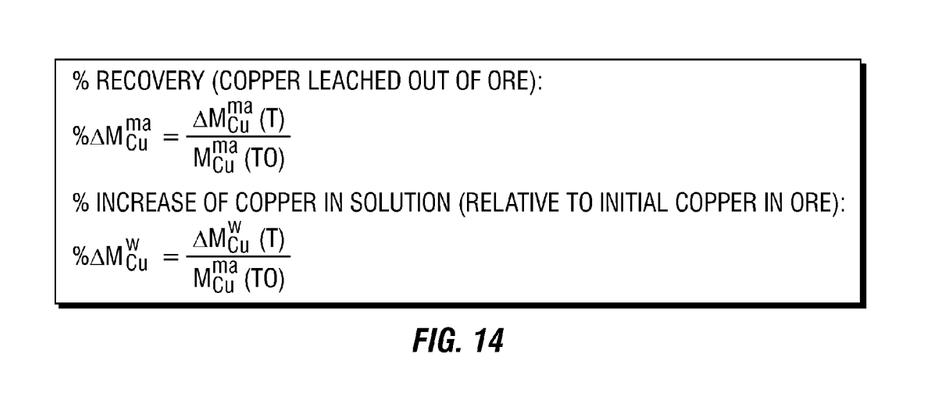
Figure 15:
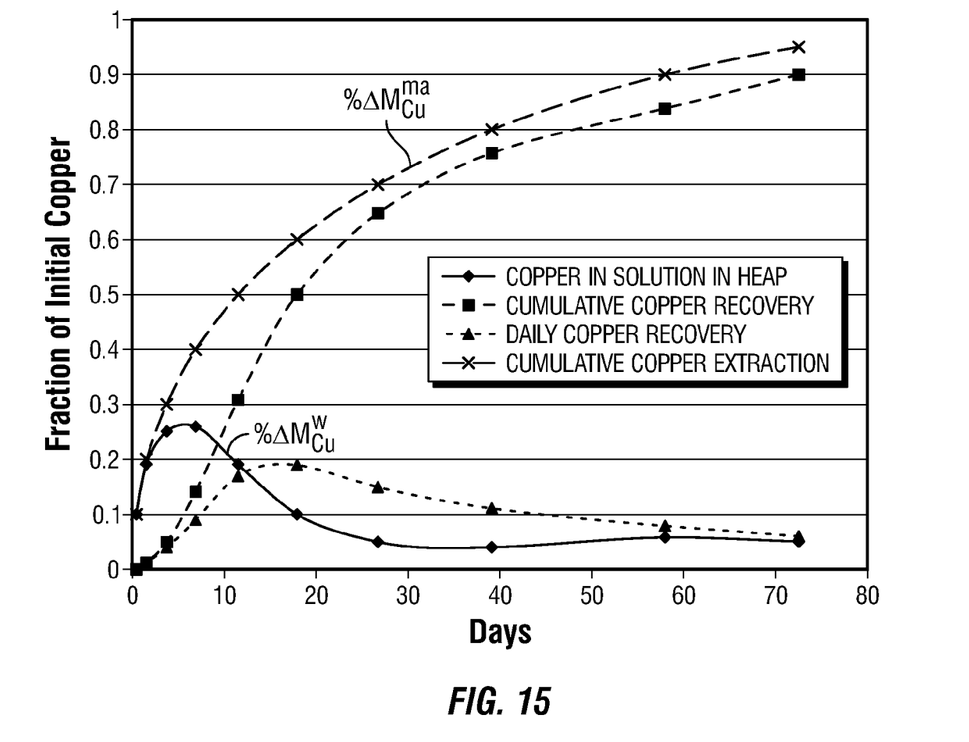
FIG. 15 is an example recovery curve illustrating copper content quantities as a recovery percentage over time.

FIGS. 12-14 illustrate example equations that may be utilized in one embodiment of the present invention to facilitate the monitoring of copper content quantities as a recovery percentage over time. In the copper example above, copper content quantities may be integrated over the height of the surveyed interval and converted into recovery curves. Next, a first logging operation at time T0 before start of leaching and a second logging operation at time T>T0, both over the height H of the ore pile may be considered. These quantities may then be presented as a recovery percentage curve versus time, as illustrated by FIG. 15. Other types of sampling and monitoring (for example sampling of pregnant leach solution at specific levels in nearby wells) may provide additional control and calibration points for the copper content in the pregnant leach solution in this example.

Successive time lapse surveys may also be used for one or more of the parameters described above. For example, it may be desirable to characterize the dissolution and transport of the vertical progression across the heap/formation. As the leaching initiates through the heap/formation, an estimation of the vertical plume length of the pregnant leach solution may be made at each layer of mineral ore in the heap/formation.

In order to forecast the production schedule and to diagnose problems (slow or excessive vertical speed of the pregnant solution, for instance), it may be desirable to ascertain the vertical distribution of the ore in the heap/formation, including pore size, particulate size distribution and vertical permeability through the heap/formation.

Nuclear magnetic resonance logs, for example, may be used to measure pore size distribution in order to allow permeability estimations. Further, micro imager logs may be used to provide high resolution images of borehole walls while morphological image processing may be used to generate estimations regarding the distribution and size of conductive and resistive features in the ore. It may also be desirable to combine particle, pore size and permeability information with copper in solution vs depth, copper still in place, porosity, and saturation information in order to generate a predictive model of heap/formation production characteristics in the monitoring well area.

As illustrated in the example of FIG. 15, the progression of copper in solution in the heap/formation provides insight into the likely daily copper recovery and thus allows mine personnel to initiate planning and/or corrective actions designed to enhance the economics of the mining operation. In one embodiment, the present invention may provide algorithms for monitoring any element of interest. In one embodiment, elements monitored by the present invention may include Copper, Iron, Aluminium, Chromium, Nickel, Sulfur, Titanium, Gadolimium, Calcium, Silicium, Potassium, Hydrogen, and/or Chlorine.

In one embodiment, survey resolution may be improved using an analysis of spectrum differences for two or more time-apart surveys. In one embodiment, this involves taking a first survey before or at an early stage of the leaching process that may be used as a baseline. Energy spectrum data from subsequent surveys may then be compared to the baseline survey for the material of interest (copper for instance). This feature of the present invention removes some uncertainty, thereby improving the resolution of the outputs. Processed data may also be used to calibrate and/or tie-in surface geophysics data such as resistivity tomography to build a full 3D model of the heap/formation.

Turning to another feature of the present invention, in one embodiment, the present invention may utilize one or more subsurface barriers capable of optimizing mining and/or remediation operations. With respect to heap leaching or in-situ leaching operations, it may be desirable to: (1) restrict the flow of groundwater into mining operational areas; and/or (2) restrict the flow of contaminants generated by the mining project into adjacent areas of the formation.

In one embodiment, the present invention contemplates the pumping of water (with or without additional chemicals) into one or more injection wells in order to flush and react with heap/formation rocks and fluids. The water and/or chemicals may then be recovered using one or more producer wells in order to extract desired materials (in-situ mining) or unwanted contaminants (environmental remediation). The present invention may also utilize water (with chemical additives) pumped into one or more injection wells in order to create sub-surface barriers around the mining operational area for the purpose of containing the flow of groundwater and/or contaminants.

Such barriers may also be created by the precipitation of salts, the use of frozen materials, immobilization of one or more gels, and/or by polymerization reactions within the heap/formation. In one embodiment, the present invention utilizes one or more active and/or passive injection control devices to: (1) homogenize the flow of lixiviants between injection and production wells during in-situ leaching operations; and (2) homogenize the flow of chemicals into the heap/formation to create underground barriers for the purpose of mitigating/preventing contamination of surrounding areas.

In one embodiment, the present invention is capable of safeguarding mining operations by: (1) utilizing, at the periphery of the leaching operation, one or more sub-surface barriers capable of diverting possible inflows from natural ground waters into the heap/formation; (2) utilizing, at the periphery of the leaching operation, one or more sub-surface barriers capable of preventing possible leaks and outflows of the residual leaching solutions into the surrounding areas; and/or (3) utilizing, at the periphery of the operation, one or more wells containing equipment capable of detecting, monitoring, and reducing the risk of such unwanted inflows or outflows. In one embodiment, the monitoring wells may be equipped with Westbay monitoring and sampling equipment.

Although the invention has been described with reference to specific embodiments, this description is not meant to be construed in a limited sense. Various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention.

What is claimed is:

1. A method of monitoring the progress of leaching operations comprising the steps of: drilling a monitoring well into a heap;
   placing one or more sensors inside the monitoring well, the sensors capable of collecting temperature or resistivity data concerning said heap; and
   analyzing said temperature or resistivity data in order to ascertain the location or characteristics of a pregnant solution within said heap.

2. The method of claim 1, wherein the sensors further comprise distributed temperature system (DTS) fiber optic sensors.

3. The method of claim 1, wherein the sensors further comprises electrodes attached to the monitoring well.

4. The method of claim 1, the method further comprising:
   generating a three dimensional temperature profile of the heap.

5. The method of claim 1, wherein a coil tubing arrangement is utilized to drill the monitoring well.

6. The method of claim 1, wherein the characteristics comprise a concentration of a metal in the pregnant solution.

7. The method of claim 6, where the sensors further comprise X-ray fluorescence spectrometers capable of measuring the concentration of the metal.

8. The method of claim 1, wherein the method further comprises:
   utilizing elemental capture spectroscopy to measure and monitor a dry weight of one or more metals in the pregnant solution.

9. The method of claim 8, wherein the method further comprises utilizing multiple passes of elemental capture spectroscopy logs to monitor a concentration of a metal in the pregnant solution.

10. The method of claim 1, wherein the method further comprises utilizing one or more active and/or passive injection control devices to homogenize a flow of lixiviants.

11. The method of claim 1, wherein the method further comprises utilizing one or more active and/or passive injection control devices to homogenize a flow of chemicals.

12. The method of claim 1, wherein the method comprises analyzing the resistivity data to determine a location of the pregnant solution within the heap.

13. The method of claim 12, wherein the resistivity data is expressed as a function of at least one of porosity, moisture content or conductivity of the pregnant solution.

14. The method of claim 1, wherein the monitoring well further comprises at least one fiberglass casing.

* * * * *